United States Patent
Yatsurugi

(10) Patent No.: US 12,531,449 B2
(45) Date of Patent: Jan. 20, 2026

(54) FIELD MAGNETON OF ROTARY ELECTRIC MACHINE

(71) Applicant: HONDA MOTOR CO., LTD., Tokyo (JP)

(72) Inventor: Manabu Yatsurugi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 18/464,976

(22) Filed: Sep. 11, 2023

(65) Prior Publication Data

US 2024/0113580 A1     Apr. 4, 2024

(30) Foreign Application Priority Data

Sep. 29, 2022   (JP) ................................ 2022-156123

(51) Int. Cl.
*H02K 1/2783* (2022.01)
*H02K 1/20* (2006.01)
*H02K 21/22* (2006.01)

(52) U.S. Cl.
CPC ............. *H02K 1/2783* (2022.01); *H02K 1/20* (2013.01); *H02K 21/22* (2013.01)

(58) Field of Classification Search
CPC ........ H02K 1/2783; H02K 1/20; H02K 21/22; H02K 9/197; H02K 21/16; H02K 2213/03; H02K 1/27; H02K 1/28; H02K 2207/00

See application file for complete search history.

(56) References Cited

U.S. PATENT DOCUMENTS

| | | | |
|---|---|---|---|
| 7,443,068 B2 | 10/2008 | Iguchi | |
| 10,122,227 B1* | 11/2018 | Long | H02K 1/2783 |
| 2018/0198334 A1* | 7/2018 | Sano | H02K 1/28 |
| 2021/0159744 A1 | 5/2021 | Sugimoto | |

FOREIGN PATENT DOCUMENTS

| | | |
|---|---|---|
| JP | 2006246624 A | 9/2006 |
| JP | 2009284703 A | 12/2009 |
| JP | 2010093950 A | 4/2010 |
| JP | 2021087242 A | 6/2021 |
| JP | 2021093879 A | 6/2021 |

OTHER PUBLICATIONS

Notice of Reasons for Refusal for Japanese Patent Application No. 2022-156123 dated Jul. 25, 2025; 6 pp.

* cited by examiner

*Primary Examiner* — Christopher M Koehler
*Assistant Examiner* — Riley Owen Stout
(74) *Attorney, Agent, or Firm* — Armstrong Teasdale LLP

(57) ABSTRACT

A field magneton of a rotary electric machine includes magnets, and a yoke provided along one of an inner peripheral surface and an outer peripheral surface of each magnet. The yoke includes a cylindrical main body extending in an axial direction from a first end surface of each magnet to a second end surface thereof, and an annular flange extending from the main body in a radial direction and including an abutting surface configured to abut against the first end surface of each magnet. The abutting surface is provided with at least one of an annular circumferential groove and radial grooves. The circumferential groove is formed at an intermediate position separated away from a base edge and a tip edge of the abutting surface. The radial grooves are formed at prescribed intervals and extend from the base edge to the tip edge.

9 Claims, 7 Drawing Sheets

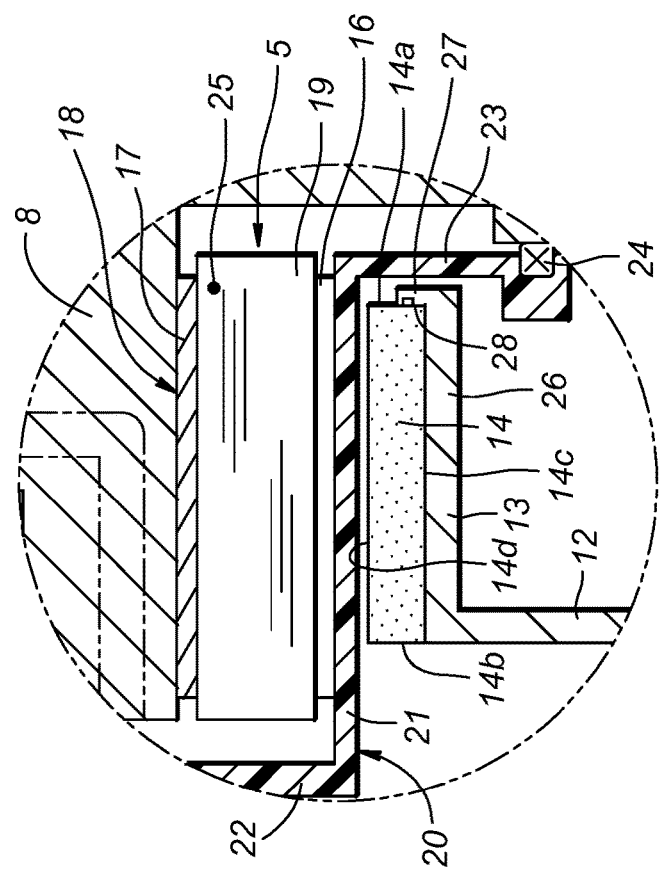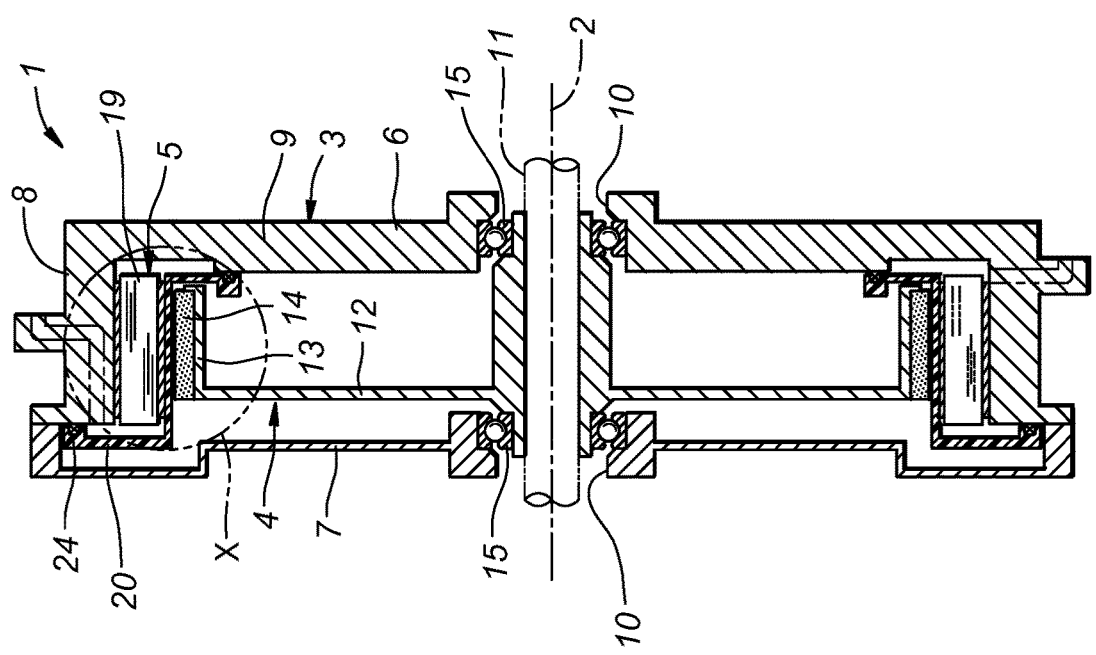

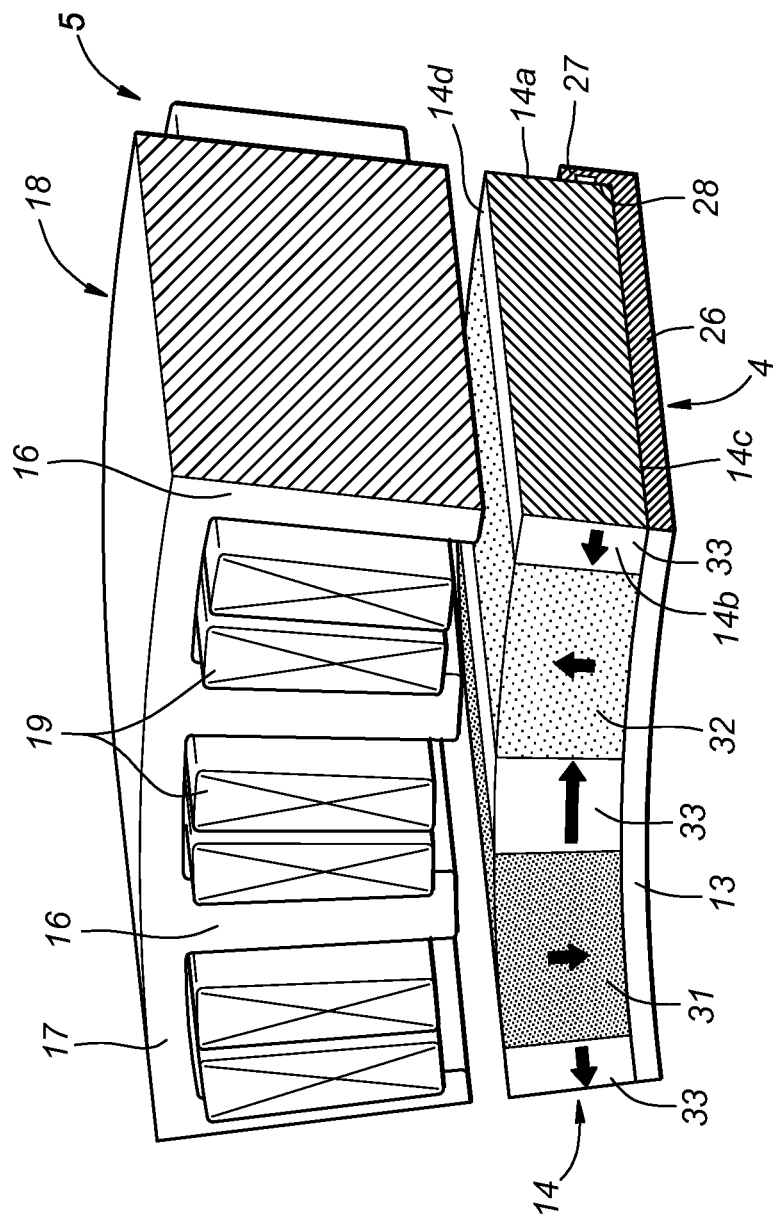

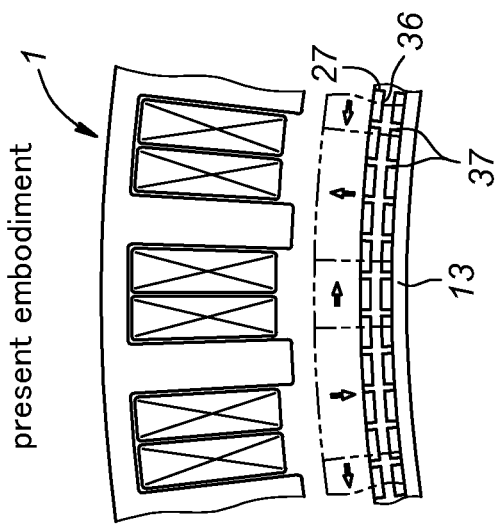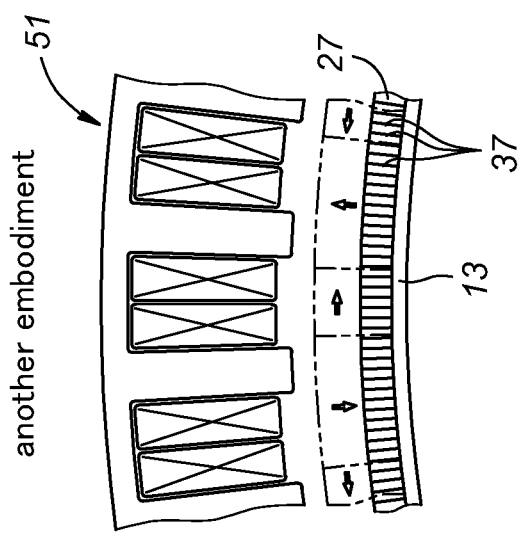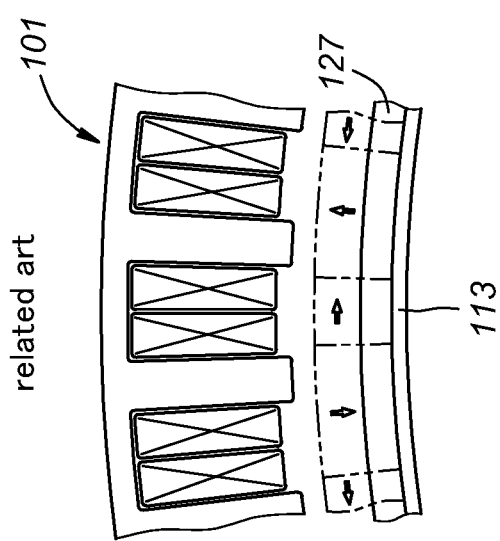

FIELD MAGNETON OF ROTARY ELECTRIC MACHINE

TECHNICAL FIELD

The present invention relates to a field magneton of a rotary electric machine.

BACKGROUND ART

A rotary electric machine comprises an armature including teeth and coils, and a field magneton including magnets and a back yoke. One of the armature and the field magneton forms a rotor that rotates around a rotation axis, while the other of the armature and the field magneton forms a stator. In a rotary electric machine of a radial gap type, the magnets and the teeth are arranged to face each other in the radial direction of the rotary electric machine. As a rotary electric machine of this kind, a rotary electric machine of an outer rotor radial gap type, which forms a field magneton by an outer rotor, is known. In this rotary electric machine, a back yoke is arranged along a magnetic pole surface of each magnet arranged outside in a radial direction.

JP2010-093950A discloses a rotary electric machine configured such that a back yoke is arranged from a magnetic pole surface of each magnet arranged outside in a radial direction to both end surfaces of each magnet in an axial direction, and an end of an inner portion (a portion arranged along both end surfaces of each magnet: hereinafter referred to as "flange") of the back yoke in the radial direction is separated away from each magnet. According to this configuration, a magnetic pole surface of each magnet arranged inside in the radial direction and an end of the back yoke (a tip end of the flange) are arranged with a gap therebetween, so that the leakage of magnetic flux can be reduced.

However, in the above conventional field magneton, the tip end of the flange of the back yoke is separated away from each magnet, which reduces an area of a portion of the flange abutting against an end surface of each magnet to restrict the movement thereof. Accordingly, a magnet holding force of the back yoke may decrease. As such, there has been a demand for a structure of a field magneton that can prevent both the leakage of magnetic flux and the decrease in a magnet holding force.

SUMMARY OF THE INVENTION

In view of the above background, an object of the present invention is to provide a field magneton that can compatibly prevent both the leakage of magnetic flux and the decrease in a magnet holding force.

To achieve such an object, one aspect of the present invention provides a field magneton (4) of a rotary electric machine (1, 51), comprising: a plurality of magnets (14) arranged annularly in a prescribed array and around an axis (2) of the rotary electric machine; and a yoke (13) provided along one of an inner peripheral surface (14c) and an outer peripheral surface (14d) of each of the magnets, wherein the yoke includes: a cylindrical main body (26) extending in an axial direction from a first end surface (14a) of each of the magnets in the axial direction to a second end surface (14b) thereof in the axial direction; and an annular flange (27) extending from the main body in a radial direction and including an abutting surface (28) configured to abut against the first end surface of each of the magnets, and the abutting surface is provided with at least one of an annular circumferential groove (36) and a plurality of radial grooves (37), the circumferential groove being formed at an intermediate position separated away from a base edge (28a) and a tip edge (28b) of the abutting surface in the radial direction, the plurality of radial grooves being formed at prescribed intervals (P) in a circumferential direction of the abutting surface and extending from the base edge to the tip edge.

According to this aspect, a tip end of the flange at least partially abuts against the first end surface of each magnet, so that a magnet holding force can be improved as compared with the conventional structure in which an annular gap is provided at the tip end of the flange. Further, at least one of the circumferential groove and the plurality of radial grooves is provided on the abutting surface, and thus magnetic flux is prevented from leaking to the outside through the flange. Accordingly, the output torque of an electric motor using the field magneton or the power generation efficiency of a generator using the field magneton can be improved.

In the above aspect, preferably, the abutting surface is provided with both the circumferential groove and the plurality of radial grooves.

According to this aspect, both the circumferential groove and the plurality of radial grooves are provided on the abutting surface, and thus magnetic flux is further prevented from leaking to the outside through the flange.

In the above aspect, preferably, the prescribed array is a Halbach array in which a third magnet (33) is arranged between a first magnet (31) and a second magnet (32), the first magnet having a magnetic pole direction pointing inward in the radial direction, the second magnet having a magnetic pole direction pointing outward in the radial direction, the third magnet having a magnetic pole direction including a component in the circumferential direction.

According to this aspect, in a field magneton with a Halbach array having a magnetic pole direction in a circumferential direction, both the leakage of magnetic flux and the decrease in a magnet holding force can be prevented compatibly.

In the above aspect, preferably, the plurality of radial grooves is formed at regular intervals in the circumferential direction, and each of the regular intervals is smaller than a width (C) of the third magnet in the circumferential direction.

According to this aspect, at least one radial groove is arranged in a portion of the abutting surface corresponding to the third magnet. Accordingly, the radial grooves effectively prevent the magnetic flux of the third magnet in the circumferential direction from leaking to the outside through the flange.

In the above aspect, preferably, the plurality of radial grooves includes a pair of radial grooves adjacent to each other in the circumferential direction, the abutting surface includes an abutting portion (38) arranged between the pair of radial grooves, and a dimension (D) in the circumferential direction of the abutting portion is larger than a width (W) of each of the radial grooves.

According to this aspect, an abutting area of the flange that actually abuts against each magnet is increased. Accordingly, it is possible to reliably position the magnets of three types with large magnetic repulsion.

In the above aspect, preferably, when viewed in the axial direction, an area ($A_{31}$) of the first magnet and an area ($A_{32}$) of the second magnet are same as each other, and when viewed in the axial direction, a groove area ratio ($A_{36}:A_{37}$) is same as a magnet area ratio ($A_{31}:A_{33}$ or $A_{32}:A_{33}$), the groove area ratio being a ratio of an area ($A_{36}$) of the circumferential groove including an overlapping portion of the circumferential groove and the radial grooves to areas ($A_{37}$) of the radial grooves including the overlapping portion, the magnet area ratio being a ratio of the area of the first magnet or the second magnet to an area ($A_{33}$) of the third magnet.

According to this aspect, the magnetic resistance of both the magnetic flux passing through the circumferential groove and the magnetic flux passing through the radial grooves are increased, and thus the magnetic flux is prevented from leaking to the outside through the flange. Accordingly, the output torque of the rotary electric machine can be improved.

In the above aspect, preferably, both the groove area ratio and the magnet area ratio are 2:1.

According to this aspect, in a field magneton having magnets arranged in a Halbach array, the effect of increasing the magnetic resistance in the flange of the yoke is enhanced. Accordingly, the output torque or the power generation efficiency can be improved significantly.

In the above aspect, preferably, the field magneton forms an inner rotor of the rotary electric machine of an inner rotor type where the yoke is provided along the inner peripheral surface of each of the magnets.

According to this aspect, one of the circumferential groove and the plurality of radial grooves is formed in an outer flange extending outward in the radial direction of the yoke. Accordingly, as compared with a case where one of the circumferential groove and the plurality of radial grooves is formed in an inner flange, the abutting area of the flange and the magnets can be easily secured, so that the magnets can be prevented from wobbling during rotation. Further, the yoke can be easily processed.

Thus, according to the above aspects, it is possible to provide a field magneton that can compatibly prevent both the leakage of magnetic flux and the decrease in a magnet holding force.

BRIEF DESCRIPTION OF THE DRAWING(S)

FIG. 1A is a cross-sectional view of an electric motor according to an embodiment;

FIG. 1B is an enlarged view of a circle X of FIG. 1A;

FIG. 2 is a perspective view of a main portion of the electric motor;

Figure 6:
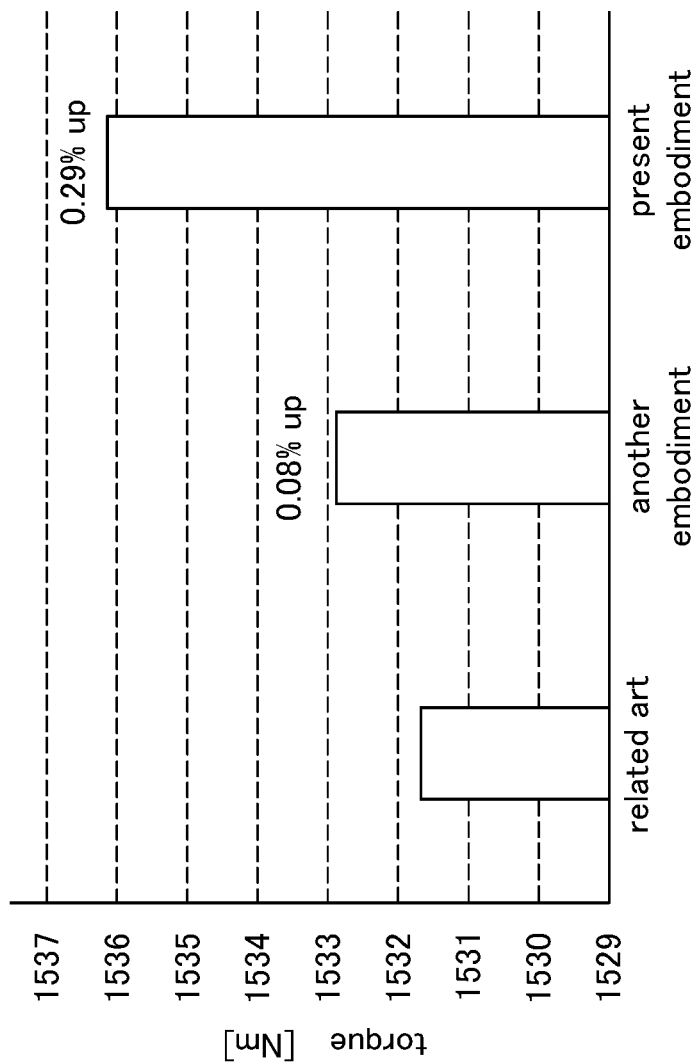
Figure 7:
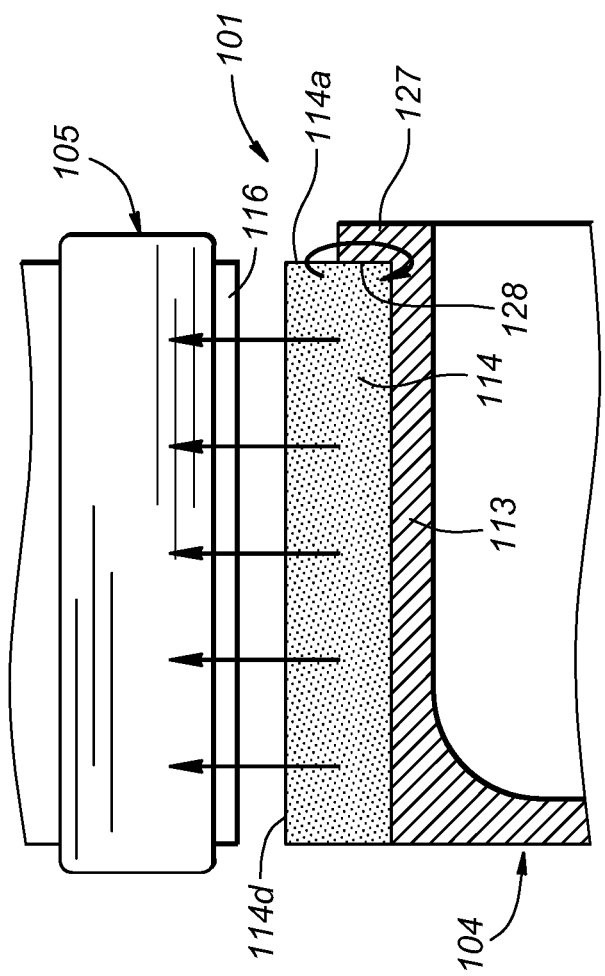

FIGS. 5A, 5B, and 5C are comparative diagrams showing schematic configurations of electric motors according to a related art, another embodiment, and the present embodiment, respectively;

FIG. 6 is a graph showing the torque of the electric motors shown in FIGS. 5A, 5B, and 5C; and FIG. 7 is an explanatory diagram for explaining the action of the electric motor according to the related art.

DETAILED DESCRIPTION OF THE INVENTION

In the following, an embodiment to which a field magneton according to the present invention is applied will be described in detail with reference to the drawings.

FIG. 1A is a cross-sectional view of an electric motor 1 (hereinafter abbreviated as "motor 1") according to the embodiment. As shown in FIG. 1A, the motor 1 includes a case 3 having a cylindrical shape centered on an axis 2, a rotor 4 supported rotatably around the axis 2 by the case 3, and a stator 5 arranged on an outer peripheral side of the rotor 4 and fixed to the case 3. That is, the motor 1 is configured as an electric motor of both an inner rotor type and a radial gap type. The motor 1 is used in a posture shown in FIG. 1A in which the axis 2 extends horizontally. The motor 1 may be used in a posture in which the axis 2 extends vertically.

The case 3 includes a case body 6 and a case lid 7 that can be separated in an axial direction (namely, a direction parallel to the axis 2) of the motor 1, and defines an accommodating space in which the rotor 4 and the stator 5 are accommodated. The case body 6 includes a cylindrical sidewall 8 and a bottom wall 9 closing the bottom of the sidewall 8. The bottom wall 9 of the case body 6 and the case lid 7 are provided with through holes 10 centered on the axis 2.

The rotor 4 includes a rotation shaft 11 extending along the axis 2 and forming an output shaft of the motor 1, a rotor hub 12 arranged around the rotation shaft 11, a cylindrical yoke 13 (rotor core) provided at an outer end of the rotor hub 12, and a plurality of permanent magnets (hereinafter abbreviated as "magnet(s) 14"). The rotor hub 12 may be provided integrally with the rotation shaft 11, or may be provided rotatably with respect to the rotation shaft 11 via a planetary gear mechanism and the like. In either of these configurations, the rotation shaft 11 rotates according to the rotation of the rotor hub 12.

The rotation shaft 11 is rotatably supported by the case body 6 and the case lid 7 via bearings 15. The rotation shaft 11 passes through the through holes 10 of the case body 6 and the case lid 7, and protrudes in the axial direction from both surfaces of the case 3. In another embodiment, the rotation shaft 11 may protrude from only one surface of the case 3. The yoke 13 is an iron rotor core having a substantially cylindrical shape centered on the axis 2. The yoke 13 is formed integrally with an outer edge of the rotor hub 12, and rotates integrally with the rotor hub 12. The motor 1 is a permanent magnet synchronous motor. On an outer circumference of the yoke 13, the plurality of magnets 14 is arranged in a prescribed array in a circumferential direction (namely, a direction around the axis 2) of the motor 1. The rotor 4 forms a field magneton of the motor 1.

The stator 5 is arranged along the sidewall 8 of the case body 6 with a prescribed gap in a radial direction (namely, a direction perpendicular to the axis 2) of the motor 1 between the stator 5 and an outer surface of the rotor 4. The stator 5 includes a stator core 18 and a plurality of coils 19. The stator core 18 includes a plurality of teeth 16 and a teeth holding ring 17 (stator yoke) arranged outside the plurality of teeth 16 and holding the plurality of teeth 16. The plurality of coils 19 is wound around the teeth 16. The stator 5 forms an armature of the motor 1. The teeth holding ring 17 has a cylindrical shape, and is centered on the axis 2. The teeth 16 are aligned in the circumferential direction along the teeth holding ring 17, and protrude inward in the radial direction from an inner surface of the teeth holding ring 17.

A stator cover 20 that covers the stator 5 together with the case body 6 is attached to the case body 6. As shown in FIG. 1B, the stator cover 20 includes a cylindrical first portion 21, an annular plate-like second portion 22 extending outward in the radial direction from one end of the first portion 21 in the axial direction, and an annular plate-like third portion 23 extending inward in the radial direction from the other end of the first portion 21 in the axial direction. The stator cover 20 is made of a non-magnetic material with low magnetic permeability, and may be an injection molded product of synthetic resin, for example. The first portion 21 is arranged between the stator 5 and the rotor 4 (that is, arranged in the abovementioned gap). The second portion 22 faces the coils 19 in the axial direction of the motor 1. An outer edge of the second portion 22 is attached tightly to the sidewall 8 of the case body 6 via a sealing member 24. An inner edge of the third portion 23 is attached tightly to the bottom wall 9 of the case body 6 via a sealing member 24.

Thus, the stator cover 20 covers the stator 5 together with the case body 6, thereby defining a cooling passage 25 for cooling the stator 5. The cooling passage 25 has a cylindrical shape, and oil supplied as a coolant flows through the cooling passage 25 in the axial direction.

FIG. 2 is a perspective view of a main portion of the motor 1, and shows an upper portion of the motor 1. The stator cover 20 is omitted in FIG. 2. As shown in FIG. 1A and FIG. 2, the yoke 13 includes a cylindrical main body 26, and an annular flange 27 extending outward in the radial direction from an end of the main body 26 in the axial direction. Each magnet 14 is provided with a first end surface 14a and a second end surface 14b arranged at both ends in the axial direction, an inner peripheral surface 14c, and an outer peripheral surface 14d. The main body 26 of the yoke 13 is provided along the inner peripheral surface 14c of each magnet 14, and extends in the axial direction from the first end surface 14a of each magnet 14 to the second end surface 14b thereof. The flange 27 of the yoke 13 extends along the first end surface 14a of each magnet 14, and includes an abutting surface 28 configured to abut against each magnet 14.

The magnets 14 include first magnets 31, second magnets 32, and third magnets 33. Each first magnet has a magnetic pole direction (magnetization direction) pointing inward in the radial direction. Each second magnet 32 has a magnetic pole direction pointing outward in the radial direction. Each third magnet 33 is arranged between the first magnet 31 and the second magnet 32. Each third magnet 33 has a magnetic pole direction including a component in the circumferential direction. That is, the magnets 14 are arranged annularly in a Halbach array. The magnetic pole direction of each magnet 14 is indicated by an arrow in the drawings. The first magnets 31 and the second magnets 32 are primary magnets and have the same shape and dimension as each other. The third magnets 33 are secondary magnets and have a dimension in the circumferential direction smaller than that of the primary magnets. The dimension in the circumferential direction of each magnet 14 is represented by an angle centered on the axis 2, and will be referred to as a circumferential width C in this specification. The circumferential width C of each third magnet 33 is half the circumferential width C of each first magnet 31 and each second magnet 32.

Figure 3:
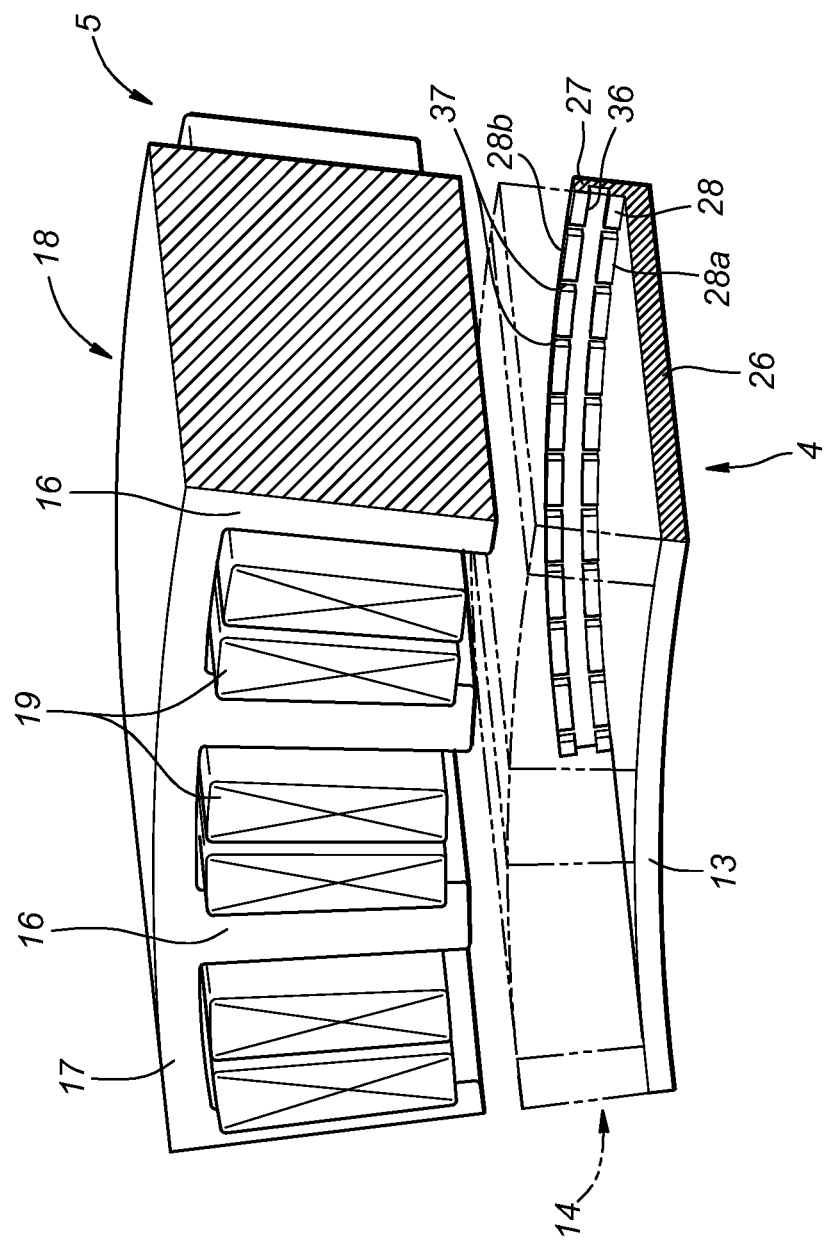
FIG. 3 is a perspective view of the main portion of the electric motor with magnets shown transparently.

FIG. 3 is a perspective view of the main portion of the motor 1 with the magnets 14 shown transparently. As shown in FIG. 3, the abutting surface 28 of the flange 27 is provided with an annular circumferential groove 36 extending in the circumferential direction at an intermediate position separated away from a base edge 28a and a tip edge 28b of the abutting surface 28 in the radial direction. Further, the abutting surface 28 is provided with a plurality of radial grooves 37 extending in the radial direction from the base edge 28a to the tip edge 28b.

Figure 4:
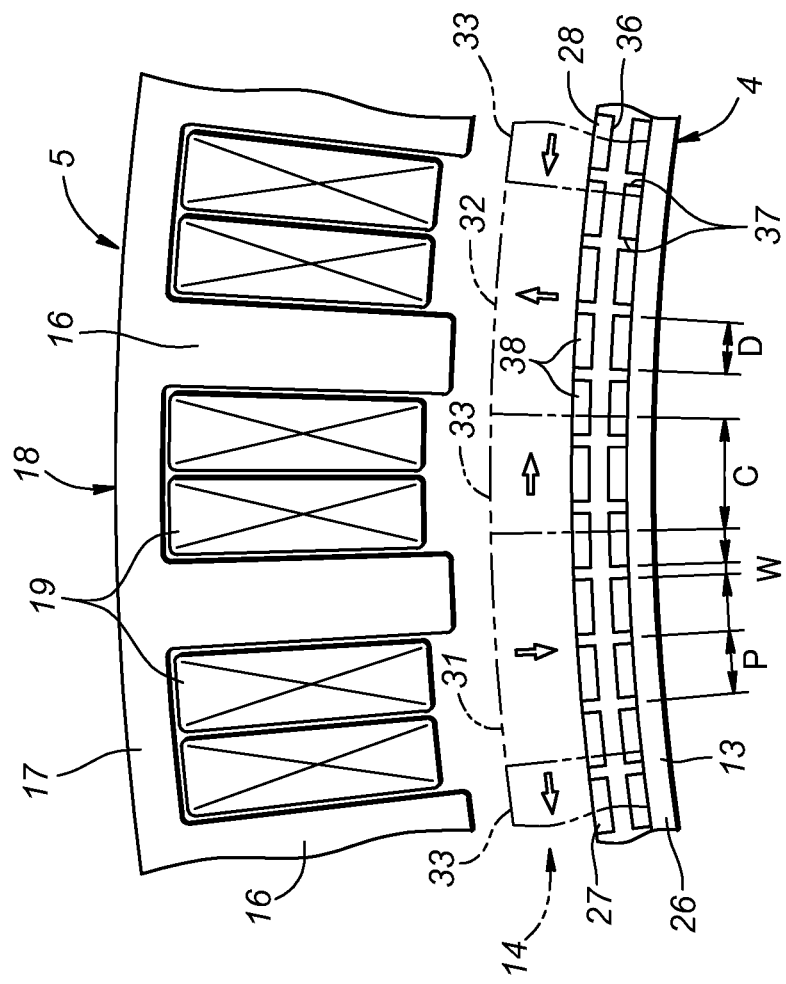
FIG. 4 is a front view of the main portion of the electric motor with the magnets shown transparently.

FIG. 4 is a front view of the main portion of the motor 1 with the magnets 14 shown transparently. As shown in FIG. 4, the height (a dimension in the radial direction) of the flange 27 is smaller than the height (a dimension in the radial direction) of each magnet 14. The height of the flange 27 is preferably between 30% and 70% inclusive, more preferably between 40% and 50% inclusive, of the height of each magnet 14. In the present embodiment, the height of the flange 27 is 45% of the height of each magnet 14.

The radial grooves 37 each have a width W, and are arranged at prescribed intervals P in the circumferential direction. In this specification, the intervals P in the circumferential direction of the radial grooves 37 mean angular intervals centered on the axis 2 (see FIG. 1A) between the centers of the radial grooves 37. In the present embodiment, the radial grooves 37 have the same shape and dimension as each other, and are arranged at regular intervals P (at equal intervals) in the circumferential direction. In another embodiment, the radial grooves 37 may be arranged at irregular intervals P depending on the arrangement of the magnets 14.

Each interval P in the circumferential direction of the radial grooves 37 is smaller than the circumferential width C of each third magnet 33. Accordingly, at least one radial groove 37 (more specifically, one or more radial grooves 37 having at least a width W) is arranged in a portion of the abutting surface 28 corresponding to each third magnet 33. Further, the width W of each radial groove 37 is smaller than ½ of each interval P in the circumferential direction of the radial grooves 37. In other words, the abutting surface 28 includes abutting portions 38, and a dimension D in the circumferential direction of each abutting portion 38 is larger than the width W of each radial groove 37.

Each abutting portion 38, which is arranged on both sides of the circumferential groove 36 and between a pair of radial grooves 37 adjacent to each other in the circumferential direction, is a portion that actually abuts against the magnets 14. Each abutting portion 38 abuts against the first end surface 14a (see FIG. 2) of each magnet 14, thereby positioning each magnet 14 in the axial direction. As described above, the dimension D in the circumferential direction of each abutting portion 38 between the pair of radial grooves 37 is larger than the width W of each radial groove 37. Accordingly, an abutting area of the flange 27 that actually abuts against the magnets 14 is increased. Accordingly, it is possible to reliably position the magnets 14 of three types with large magnetic repulsion.

In that regard, a tip end of the flange 27 at least partially abuts against the first end surface 14a (see FIG. 2) of each magnet 14. Accordingly, a holding force of the magnets 14 can be improved as compared with the conventional structure (JP2010-093950A) in which an annular gap is provided at the tip end of the flange 27. Further, at least one of the circumferential groove 36 and the plurality of radial grooves 37 is provided on the abutting surface 28, and thus magnetic flux is prevented from leaking to the outside through the flange 27. Accordingly, the output torque of the motor 1 using the field magneton or the power generation efficiency of a generator using the field magneton can be improved. In the following, the effect thereof will be described with reference to FIG. 7.

FIG. 7 is an explanatory diagram for explaining the action of an electric motor 101 (hereinafter abbreviated as "motor 101") according to the related art. In the motor 101, a yoke 113 of a rotor 104 includes a flange 127, but an abutting surface 128 of the flange 127 is not provided with any groove. Accordingly, the magnetic flux to act on a teeth 116 of a stator 105 from an outer peripheral surface 114d of each magnet 114 leaks from a first end surface 114a to the flange 127. Accordingly, the magnetic flux acting on the stator 105 becomes sparse, and thus the output torque of the motor 101 is decreased.

By contrast, in the present embodiment, the abutting surface 28 of the flange 27 is provided with the circumferential groove 36 and the radial grooves 37 as shown in FIG. 4. Accordingly, magnetic flux is prevented from leaking to the outside through the flange 27. The leakage of magnetic flux includes the leakage that magnetic flux passes through the flange 27 in the radial direction and the leakage that magnetic flux passes through the flange 27 in the circumferential direction. Accordingly, by forming at least one of the circumferential groove 36 and the radial grooves 37 on the abutting surface 28, magnetic flux is prevented from leaking to the outside through the flange 27. In the present embodiment, by providing both the circumferential groove 36 and the radial grooves 37 on the abutting surface 28, magnetic flux is further prevented from leaking to the outside through the flange 27. The effect of preventing magnetic flux from leaking will be described later in detail.

In the present embodiment, the rotor 4 includes a plurality of magnets 14 arranged in a Halbach array. Accordingly, in the rotor 4 with a Halbach array, both the leakage of magnetic flux and the decrease in a magnet holding force can be prevented compatibly.

As described above, the radial grooves 37 are formed at the regular intervals P in the circumferential direction, and each interval P is smaller than the circumferential width C of each third magnet 33. Thus, at least one radial groove 37 is arranged in a portion of the abutting surface 28 corresponding to each third magnet 33. Accordingly, the radial grooves 37 effectively prevent the magnetic flux of each third magnet 33 in the circumferential direction from leaking to the outside through the flange 27.

Each first magnet 31 and each second magnet 32 have the same shape and dimension. Accordingly, when viewed in the axial direction as shown in FIG. 4, the area $A_{31}$ of each first magnet 31 and the area $A_{32}$ of each second magnet 32 are the same. When viewed in the axial direction, the area A of the radial grooves 37 including an overlapping portion of the circumferential groove 36 and the radial grooves 37 is defined as a radial groove area $A_{37}$. Further, the area A of the circumferential groove 36 including the overlapping portion of the circumferential groove 36 and the radial grooves 37 is defined as a circumferential groove area $A_{36}$. In the present embodiment, when viewed in the axial direction, a groove area ratio ($A_{36}$:$A_{37}$), which is a ratio of the circumferential groove area $A_{36}$ to the radial groove area $A_{37}$, is the same as a magnet area ratio ($A_{31}$:$A_{33}$), which is the ratio of the area $A_{31}$ of each first magnet 31 to the area $A_{33}$ of each third magnet 33. Accordingly, the magnetic resistance of both the magnetic flux passing through the circumferential groove 36 and the magnetic flux passing through the radial grooves 37 are increased, and thus the magnetic flux is prevented from leaking to the outside through the flange 27. Accordingly, the output torque of the motor 1 can be improved.

Furthermore, in the present embodiment, the circumferential width C of each third magnet 33 is half the circumferential width C of each first magnet 31 and each second magnet 32. Accordingly, both the groove area ratio ($A_{36}$:$A_{37}$) and the magnet area ratio ($A_{31}$:$A_{33}$) are set to 2:1. Accordingly, in the motor 1 having the magnets 14 arranged in a Halbach array, the effect of increasing the magnetic resistance in the flange 27 is enhanced. Accordingly, the output torque of the motor 1 can be improved significantly.

As described above, the rotor 4 forms an inner rotor of the motor 1 of an inner rotor type in which the yoke 13 is provided along the inner peripheral surface 14c of each magnet 14. That is, one of the circumferential groove 36 and the plurality of radial grooves 37 is formed in the flange 27 (outer flange) extending outward in the radial direction of the yoke 13. Accordingly, as compared with a case where one of the circumferential groove 36 and the plurality of radial grooves 37 is formed in an inner flange, the abutting area of the flange 27 and the magnets 14 can be easily secured, so that the magnets 14 can be prevented from wobbling during rotation. Further, the yoke 13 can be easily processed.

Next, with reference to FIGS. 5A, 5B, 5C, and 6, the effect of preventing the leakage of magnetic flux by the motor 1 according to the present embodiment and an electric motor 51 (hereinafter abbreviated as "motor 51") according to another embodiment of the present invention will be described. FIGS. 5A, 5B, and 5C are comparative diagrams showing schematic configurations of motors 101, 51, and 1 according to the related art, another embodiment, and the present embodiment, respectively. FIG. 5A shows the motor 101 according to the related art shown in FIG. 7. FIG. 5B shows the motor 51 according to another embodiment of the present invention. FIG. 5C shows the motor 1 according to the present embodiment shown in FIG. 4.

As described above, in the motor 101 according to the related art shown in FIG. 5A, the abutting surface 128 of the flange 127 is not provided with any groove. In the motor 51 according to another embodiment shown in FIG. 5B, the radial grooves 37 are formed on the abutting surface 28 of the flange 27, but the circumferential groove 36 is not formed thereon. In the motor 1 according to the present embodiment shown in FIG. 5C, the radial grooves 37 and the circumferential groove 36 are formed on the abutting surface 28 of the flange 27. In the motor 51 according to another embodiment shown in FIG. 5B, each interval P (see FIG. 4) in the circumferential direction of the radial grooves 37 is set such that the groove area in FIG. 5B is the same as the groove area in FIG. 5C. The output torque of the motors 1, 51, and 101 was measured as these motors are driven under the same conditions.

FIG. 6 is a graph showing the torque (output torque) of the motors 101, 51, and 1 shown in FIGS. 5A, 5B, and 5C, respectively. As shown in FIG. 6, the motor 51 according to another embodiment improved the output torque by 0.08% as compared with the motor 101 according to the related art. Further, the motor 1 according to the present embodiment improved the output torque by 0.29% as compared with the motor 101 according to the related art. The only difference between these motors 1, 51, and 101 is the presence or absence of the grooves. Accordingly, it was confirmed that the presence of the grooves improved the output of the motors 1, 51 as compared with the motor 101 according to the related art.

Concrete embodiments of the present invention have been described in the foregoing, but the present invention should not be limited by the foregoing embodiments and various modifications and alterations are possible within the scope of the present invention. For example, in the above embodiment, the field magneton according to the present invention is applied to the rotor 4 of the motor 1 of an inner rotor type. The field magneton according to the present invention may be applied to an outer rotor of an electric motor of an outer rotor type. Further, the field magneton may be applied to an outer stator or an inner stator of a rotary electric machine such as a brush motor including a rotating armature. Further, the field magneton may be applied to not the motor 1 but a generator. Furthermore, in the present embodiment, the rotor 4 includes the magnets 14 in a Halbach array, but the array of the magnets is not limited to this. Further, the specific configuration, arrangement, quantity, material, or the like of each member and portion can be changed as appropriate within the scope of the present invention. Moreover, all of the components shown in the above embodiment are not necessarily essential, and can be selected as appropriate.

The invention claimed is:

1. A field magneton of a rotary electric machine, comprising:
   a plurality of magnets arranged annularly in a prescribed array and around an axis of the rotary electric machine; and
   a yoke provided along one of an inner peripheral surface and an outer peripheral surface of each of the magnets, wherein the yoke includes:
   a cylindrical main body extending in an axial direction from a first end surface of each of the magnets in the axial direction to a second end surface thereof in the axial direction; and
   an annular flange extending from the main body in a radial direction and including an abutting surface configured to abut against the first end surface of each of the magnets in the axial direction, and
   the abutting surface is provided with both of an annular circumferential groove and a plurality of radial grooves, the circumferential groove being formed at an intermediate position separated away from a base edge and a tip edge of the abutting surface in the radial direction, the plurality of radial grooves being formed at prescribed intervals in a circumferential direction of the abutting surface and extending from the base edge to the tip edge.

2. The field magneton according to claim 1, wherein the prescribed array is a Halbach array in which a third magnet is arranged between a first magnet and a second magnet, the first magnet having a magnetic pole direction pointing inward in the radial direction, the second magnet having a magnetic pole direction pointing outward in the radial direction, the third magnet having a magnetic pole direction including a component in the circumferential direction.

3. The field magneton according to claim 2, wherein the plurality of radial grooves is formed at regular intervals in the circumferential direction, and each of the regular intervals is smaller than a width of the third magnet in the circumferential direction.

4. The field magneton according to claim 3, wherein the plurality of radial grooves includes a pair of radial grooves adjacent to each other in the circumferential direction,
   the abutting surface includes an abutting portion arranged between the pair of radial grooves, and
   a dimension in the circumferential direction of the abutting portion is larger than a width of each of the radial grooves.

5. The field magneton according to claim 4, wherein when viewed in the axial direction, an area of the first magnet and an area of the second magnet are same as each other, and
   when viewed in the axial direction, a groove area ratio is same as a magnet area ratio, the groove area ratio being a ratio of an area of the circumferential groove including an overlapping portion of the circumferential groove and the radial grooves to areas of the radial grooves including the overlapping portion, the magnet area ratio being a ratio of the area of the first magnet or the second magnet to an area of the third magnet.

6. The field magneton according to claim 5, wherein both the groove area ratio and the magnet area ratio are 2:1.

7. The field magneton according to claim 1, wherein the field magneton forms an inner rotor of the rotary electric machine of an inner rotor type where the yoke is provided along the inner peripheral surface of each of the magnets.

8. The field magneton according to claim 1, wherein the flange is integrated with the main body.

9. The field magneton according to claim 2, wherein when viewed in the axial direction, a groove area ratio is same as a magnet area ratio, the groove area ratio being a ratio of an area of the circumferential groove including an overlapping portion of the circumferential groove and the radial grooves to areas of the radial grooves including the overlapping portion, the magnet area ratio being a ratio of the area of the first magnet to an area of the third magnet.

* * * * *